United States Patent [19]

Bernacchi et al.

[11] Patent Number: 5,008,121
[45] Date of Patent: Apr. 16, 1991

[54] STORAGE STABLE, READILY RECONSTITUTED COMESTIBLE

[75] Inventors: Donald B. Bernacchi; Robert J. Loewe, both of Chicago; Donna L. Immel, Green Oaks, all of Ill.

[73] Assignee: Griffith Laboratories Worldwide, Inc., Alsip, Ill.

[21] Appl. No.: 416,601

[22] Filed: Oct. 3, 1989

Related U.S. Application Data

[63] Continuation of Ser. No. 232,910, Aug. 16, 1988, which is a continuation-in-part of Ser. No. 941,690, Dec. 15, 1986, Pat. No. 4,764,386, which is a continuation-in-part of Ser. No. 779,657, Sep. 24, 1985, Pat. No. 4,744,994.

[51] Int. Cl.⁵ ................................................ A23P 1/08
[52] U.S. Cl. ...................................... 426/89; 426/293; 426/303
[58] Field of Search ............... 426/89, 96, 95, 100, 426/237, 238, 293, 302, 289, 273, 244, 555, 303, 291, 292, 119, 128, 94, 295, 292, 106, 108

[56] References Cited

U.S. PATENT DOCUMENTS

| | | | |
|---|---|---|---|
| 3,169,069 | 2/1965 | Hanson | 426/302 |
| 4,199,603 | 4/1980 | Sortwell | 426/92 |
| 4,272,553 | 6/1981 | Bengtsson | 426/241 |
| 4,423,078 | 12/1983 | Darley | 426/549 |
| 4,499,113 | 2/1985 | Mochezuki | 426/293 |
| 4,504,502 | 3/1985 | Earle | 426/293 |
| 4,529,607 | 7/1985 | Lenchin | 426/94 |
| 4,595,597 | 6/1986 | Lenchin | 426/555 |
| 4,744,994 | 5/1988 | Bernacchi | 426/293 |
| 4,764,386 | 8/1988 | Bernacchi | 426/293 |

*Primary Examiner*—Carolyn Paden
*Attorney, Agent, or Firm*—Barry W. Sufrin

[57] ABSTRACT

An improved product is disclosed which is a coated frozen comestible which is stable when stored for extended periods. When reconstituted by microwave heating or by baking this product has a texture and appearance which is organoleptically equivalent or superior to fat fried coated comestibles.

1 Claim, 3 Drawing Sheets

| # STORAGE STABLE, READILY RECONSTITUTED COMESTIBLE

This is a continuation of copending application Ser. No. 07/232,910 filed on Aug. 16, 1988 which is a continuation-in-part of Ser. No. 941,690 filed Dec. 15, 1986 and issued as U.S. Pat. No. 4,764,386 on Aug. 16, 1988; which is a continuation-in-part of Ser. No. 779,657 filed Sept. 24, 1985 and issued as U.S. pat. No. 4,744,994 on May 17, 1988.

BACKGROUND OF THE INVENTION

This invention relates generally to coated frozen comestibles. More particularly, this invention relates to a process for the preparation of batter coated and breaded frozen comestibles which exhibit good storage stability and which, when reconstituted by microwave heating or by baking in a conventional oven, have a texture and appearance organoleptically equivalent or superior to that of fat fried coated comestibles. This invention relates as well, to the comestibles produced by the described and claimed process.

Batter coated and breaded frozen comestibles are used widely, both in large scale food preparation operations, such as are found in restaurants and public institutions, and on a smaller scale, in the preparation of meals in the home. Frozen comestibles generally are popular due to their storage stability, relative ease of reconstitution and economy.

Frozen comestibles typically have a high water content and release a substantial amount of free water when they are heated. When conventional batter coated and breaded frozen comestibles such as poultry, fish, red meats, and vegetables are subjected to microwave heating or to baking in a conventional oven, the released free water saturates the coating, making it non-adherent, mushy, pasty in flavor, and generally organoleptically undesirable. This problem is aggravated in conventional batter coated and breaded frozen comestibles which are subjected to repeated freeze-thaw cycles during storage. In order to obtain a crisp, brown continuous outer coating on the surface of such products, it has heretofore been necessary to reconstitute the batter coated and breaded comestibles only by frying, which produces high cooking temperatures that drive off the free water.

If batter coated and breaded frozen comestibles could be made in a way which permitted not only reconstitution by microwave heating or by baking in a conventional oven, but also permitted extended storage, an important contribution to the art would be at hand. Such products would be well received in the marketplace both due to their storage characteristics and because, when reconstituted, they would be healthier and more economical than prior such products reconstituted by frying, which requires the addition of expensive, high calorie fats and oils. Furthermore, the product would be more convenient to use than currently available frozen comestibles since reconstitution by microwave heating can be accomplished far more rapidly than reconstitution by frying or by any other presently known method.

It has been suggested that batter coated and breaded frozen comestibles including poultry, fish, red meats, vegetables, fruits, cheeses, and fabricated foods be subjected to a pre-frying step prior to packaging to partially cook the coating, thereby improving the end product obtained by microwave heating or conventional oven baking. Unfortunately, even this pre-frying step is insufficient to make possible the desired product because presently known batter and breaded coatings prepared in this manner are subject to migration across the coatings of internal product moisture and external cooking oil. This causes undesirable surface oil and moisture saturation on reconstitution.

Another approach which has been suggested for producing a crisp, browned end product from batter coated frozen comestibles is described in U.S. Pat. No. 4,199,603. That patent describes the use of a single edible oil/starch/particulate coating which is applied to the frozen comestible prior to packaging. Unfortunately, when the frozen comestible is reconstituted, the edible oil fraction of the coating becomes fluid and, together with the internal moisture of the comestible, causes the coating to soften significantly, producing an undesirable reconstituted product.

BRIEF DESCRIPTION OF THE FIGURES

The following is a description of the FIGURES which are discussed in the Examples below.

SUMMARY OF THE INVENTION

Figure 1:
FIG. 1 is a photomicrograph of the substrate to coating interface of a conventional batter coated chicken nugget.

It is an object of the present invention to provide a frozen comestible with a batter and/or breaded coating which, when reconstituted by microwave heating or by baking in a conventional oven, will have a texture and appearance organoleptically equivalent or superior to that of fat-fried comestibles.

It is a further object of the present invention to provide a frozen comestible with a batter and/or breaded coating which exhibits improved storage stability.

It is another object of the present invention to provide a batter coated and/or breaded frozen comestible which can be reconstituted as a crisp, organoleptically desirable product by microwave heating, without using specially manufactured microwaveable cookware.

A further object of the present invention is to provide a double coating and frying method for comestibles in which, on reconstitution of the comestibles, the first coating controls the migration of incipient moisture and oil to enable the desired crispiness to be imparted to the second coating.

Yet another object of the present invention is to provide a method for producing a comestible with a generally continuous gelatinized starch membrane or coating for controlling migration of moisture on reconstitution of the comestible.

A still further object of the present invention is to provide a coated, frozen comestible produced by the unique process of the present invention.

Other objects and advantages of the present invention will appear hereinafter.

The present invention is directed to a process for preparing coated, frozen comestibles by:
1) enrobing the comestibles with a first batter optionally containing sugar;
2) subjecting the coated comestibles to treatment by steam or hot water for a sufficient time to gelatinize the starch components of the batter flour,
3) frying the once coated comestibles;
4) coating the comestibles with a second coating optionally comprising a hydrated high amylopectin starch;
5) optionally applying a breading;
6) frying again, and then
7) freezing the resulting product.

This process seals moisture within the coated comestible to a degree hitherto not achieved in the art, enabling the product to be stored for extended periods and to retain its surface crispiness and other desirable organoleptic qualities during microwave or conventional oven reconstitution, as well as during reconstitution by frying.

DESCRIPTION OF THE PREFERRED EMBODIMENTS

The present invention finds application with any comestible that can be coated with a batter and/or breading, including poultry, fish, red meats, (eg. beef, pork and lamb), egg products, vegetables, fruits, cheeses and fabricated foods.

"Egg products", for these purposes, are any foods derived from eggs of the domestic hen, broken from the shells and then used whole, separated into yolks or whites, dried or frozen. "Fabricated foods" are foods prepared from novel combinations of dietary ingredients and/or processing technology which are covered under the provisions of the Code of Federal Regulations, Food and Drugs, Title 21, Section 102.5 Examples of fabricated foods include restructured meats and seafoods, and meat/vegetable/egg based patties.

THE FIRST COATING

The Flour

The process of the present invention includes a dual flour-based coating procedure. The flour can be a malted or unmalted red or white, spring or winter wheat flour exhibiting a wide range of gluten strengths along with a similar range of protein and farinograph water absorption values. Such flours may optionally also be bleached, bromated, and/or aged. These flours can include spring wheat, high gluten spring wheat, and straight grade wheat flour. Within these categories, the malted form of the flours is less preferred because it produces a less crispy product. Also, it is noted that the identified types of flours can be used singly or in combination.

The preferred wheat flours used in the first coating will have the following characteristics (percentages are by weight):

| Flour Characteristics | Preferred | Most Preferred |
|---|---|---|
| Protein (N × 5.7, 14% moisture basis) | 9–14% | 11–13% |
| Ash (14% moisture basis) | 0.40–0.55% | 0.45–0.50% |
| Water absorption (Brabender Farinograph, American Association of Cereal Chemists Method 54-21) | 56–65% | 60–63% |

The Shortening

The shortening used in preparing the first coating can be a plastic, flake, or powdered shortening, from vegetable and/or animal sources. Plastic shortenings are mixtures of liquid and crystalline triglycerides in which the liquid oil is enmeshed in a mass of minute fat crystals that represent separate and discrete particles. Flaked shortenings are derived from this product and possess higher Wiley melting points and Solid Fat Index profiles. Shortening powders are processed from the same oils cited above and further contain other processing aids such as sugars, caseinates, phosphates, antioxidants and free-flowing agents.

Typical, conventionally available shortenings which, in accordance with the method of the present invention achieve a tenderized coating of the desired crispiness without excessive toughness or brittleness, include blends of partially hydrogenated soybean, cottonseed, coconut, and/or palm oils of the following specifications:

| Characteristics | Preferred | Most Preferred |
|---|---|---|
| AOM Stability, hours | 70–200 | 100–200 |
| Wiley Melting Point, °C. | 32–60 | 38–54 |
| Solid Fat Index (SFI) | | |
| @ 10° C. | 20–70 | 30–60 |
| @ 21° C. | 15–70 | 20–60 |
| @ 33° C. | 10–40 | 15–25 |
| @ 38° C. | 0–40 | 10–20 |

The Adhesion Agents/Egg Whites

In a preferred embodiment of the invention, the comestible is dipped in an adhesion agent before applying the first coating. The adhesion agent should be an aqueous solution or dispersion containing about 20–30% solids. Useful adhesion agents include egg white, modified corn, and wheat adhesion starches. Additionally, egg white can be added to the first coating to improve the crispiness of the coated comestible after reconstitution.

In both cases, dried egg white is preferred due to its ease of handling and its excellent microbial stability. Fresh egg white may, however, also be used, both as an adhesion agent and as a component of the first coating.

The Sugar

The first coating may optionally include sugar which is believed to contribute both to storage stability and to crispiness of the reconstituted product. Useful sugars include those chosen from the following groups: monosaccharides, disaccharides, polysaccharides, dextrins, polyols, derived sugar acids, modified sugars, and saccharide syrups. Naturally, sugars in this group may be combined as desired. Particularly useful sugars include dextrose, fructose, lactose, maltose, sucrose, maltodextrin, mannitol and sorbitol. Finally, the most preferred sugar is sucrose.

The sugar may be incorporated into the first coating at levels ranging from about 0.5 to 25 percent by weight sugar based on the dry weight of the flour and other ingredients used in making up the first coating. Levels of about 2 to 18 percent by weight sugar are preferred and 10 percent by weight is most preferred.

Preparation of First Coating

The first coating is prepared by blending the flour, the vegetable shortening and, when used, the egg white and/or the sugar, with sufficient water to yield a batter of the desired consistency.

The first coating will comprise a dry batter mixture of about 60 to 95 parts by weight of flour per 100 parts of the mixture and about 5 to 40 parts by weight of shortening per 100 parts of the mixture hydrated with about 32 to 200 parts by weight of water per 100 parts of the dry batter mixture. Preferably, the flour will be present at about 60 to 85 parts by weight per 100 parts of the mixture, the shortening will be present at about 15 to 40 parts by weight per 100 parts of the mixture, and the water will be present at about 32 to 125 parts by weight per 100 parts of the dry batter mixture.

When dried egg white is used, a range of from about 85 to 95 parts by weight of flour is combined with a range of from about 5 to 15 parts by weight of dried egg white per 100 parts of the flour-dried egg white batter mixture. With such use, the water hydration range would be expanded to from about 25 to 200 parts by weight of water per 100 parts of dry batter mixture.

Finally, when both dried egg white and sugar are used, the first coating comprises a dry batter mixture of about 60 to 94.5 parts by weight of flour per 100 parts of the dry batter mixture, about 5 to 15 parts by weight of dried egg white per 100 parts of the dry batter mixture, about 0.5 to 25 parts by weight of sugar per 100 parts of the dry batter mixture and about 5 to 40 parts by weight of shortening per 100 parts of the dry batter mixture hydrated with about 25 to 200 parts by weight of water per 100 parts of the dry batter mixture.

The consistency of the batter must be determined on a case-by-case basis, depending on the nature of the comestibles being coated and the coating system intended to be used. For example, a batter of lower water content ("dough") can be sheeted, wrapped around a comestible portion, and cut to form a complete seal. Alternatively, a batter with higher water content can be applied by dipping or spraying onto the comestible portion.

Preferably, the comestible will be tempered or held under specified refrigeration temperatures (generally about $-4$ to $0°$ C.) to stabilize its surface texture and moisture content prior to application of the batter.

After the comestible is enrobed with the first coating, it is treated with hot water or steam for a period of time sufficient to gelatinize the starch component of the flour to form a generally continuous membrane around the substrate. When steam is used it should be maintained in the range of about $100.5°-150°$ C., more preferrably in the range of about $100.5°-127°$ C., and most preferably in the range of about $100.5°-121°$ C. When a water bath is used, it should be maintained at from about 100 to $125°$ C. over a pressure range of from 0 to 15 pounds per square inch (psi). In a preferred embodiment, the bath is maintained at $100°$ C. at atmospheric pressure (0 psi). Although a maximum of ninety seconds of steam or waterbath treatment is a good benchmark, in both water bath and steam treatment, the ideal treatment time will have to be determined on a case-by-case basis depending, inter alia, on the size, density, water content, fat content, etc. of the comestible being prepared.

Following boiling, the comestible is immediately fried for about 30 seconds to 2 minutes at a temperature preferably in the range of about $177°-216°$ C. and most preferably in the range of about $193°-204°$ C. The cooking time is selected to properly set up the first coating without making the coating doughy and pasty (undercooked) or burned, hard, dried-out and leathery (overcooked).

Any general purpose animal or vegetable fat capable of being heated to and retaining its stability in the desired temperature range can be used in this frying step, as long as the comestible is completely submerged in the fat to assure even and complete cooking. Optionally, docking holes can be made in the coating before frying, in order to minimize separation of the coating from the surface of the comestible due to steam release during frying.

THE SECOND COATING

The second coating may be applied to the once-coated/water bath or steam treated/fried comestible immediately after the completion of the frying step or this application may be delayed. There is no need to cool before recoating.

In a preferred embodiment, the second coating is an unleavened batter comprising a hydrated high amylopectin starch which reduces retrogradation, minimizing the formation of undesirable physical characteristics in the reconstituted product such as chewiness and toughness. A "high amylopectin starch" constitutes any starch containing about 70 percent or more amylopectin. One particularly preferred such starch is waxy maize starch.

The high amylopectin starch preferably comprises about 1–7.5 percent by weight of the coating, more preferably about 2–6 percent by weight and more preferably about 5 percent by weight. In each case the starch is hydrated with sufficient water to make 100% of the batter.

Alternatively, the second coating may be a chemically leavened batter or a combination of a batter (chemically leavened and/or unleavened) with a supplemental breading. A chemically leavened batter, which is preferred over unleavened batters (other than high amylopectin starch batter as discussed above), comprises any combination of cereal flours and salt, along with a bicarbonate salt and an acid reactant which combine to produce carbon dioxide gas to yield the crisp, porous coating typically associated with leavened systems. Development of optimum texture is not dependent upon an added breading. By contrast, an unleavened batter is composed of the cereal flours and salt and/or processed starches, gums, and egg and dairy products, and serves primarily as an adhesion layer between the coated comestible and the supplemental breading.

Optional ingredients may be added to this second coating to impart the desired coloring and flavoring, such as corn sugar, whey, milk/egg powders, spices, powdered lemon juice, etc. Those familiar with the art will be able to readily determine the levels and types of optional ingredients necessary or desirable for the particular comestible being coated.

The single coated, once-fried portions are dipped into the second coating followed by optional application of a breading, if desired.

This breading may, for example, be formed of low density Japanese-style crumbs which are characterized by an elongate shape and a splintered appearance, such as those described in the present assignee's U.S. Pat. No. 4,423,078.

The breading may contain small quantities of components to impart color to the reconstituted comestible and/or to affect the browning rate upon reconstitution. For example, caramel coloring or dextrose may be present. The optimum particle size and browning rates of these breadings are based on the comestible to be coated and the overall appearance desired.

After application of the second coating, (with or without breading), the twice-coated comestibles are fried a second time. The temperature and duration of the second frying step will depend to a great extent upon the nature of the second coating. For example, when a high amylopectin hydrated waxy maize starch batter with a supplemental breading is used to form the second coating, a frying time of at least two minutes at about 205°-216° C. is preferred. On the other hand, when a chemically leavened batter, or a combination of a batter leavened or unleavened but excluding high amylopectin starch batters, and a supplemental breading are used, the second frying step is preferably conducted for about 20 to 60 seconds at about 193°-216° C. Typically, the latter frying time would not be decreased below about 20 seconds since this would require a higher frying temperature to achieve complete cooking. This could increase the rate of breakdown of the frying fat to an unacceptable level. However, the frying time could h=increased to as long as 2 minutes if the corresponding temperature were reduced to about 177° C. As in the first frying step, it is important that the product be completely submerged during frying to insure complete cooking.

After the second frying step, the comestible is rapidly frozen, preferably to at least $-5°$ C. and most preferably to at least $-30°$ C.

The resulting product may be stored for extended periods. When it is desired to reconstitute the product, it may be heated in a microwave oven directly from the frozen state. The actual cooking time will depend upon the temperature desired in the finished product as well as the power available in the microwave oven.

It is an important feature of the present invention that the special ceramic dishes typically required in microwave cooking to obtain browning can but need not be used with the frozen comestible products of the present process. For example, the present products can be heated on absorbent tissue. Preferably, however, the present products will be heated on absorbent fiberboard heating trays that are commercially available for microwave use. Such absorbent trays are designed to maximize uniform microwave transmission and to remove residual surface oil and moisture from the coated products.

The following examples are intended to illustrate the practice of the present invention. These examples are not intended to be exhaustive or limiting of the invention.

Although the principal focus of the examples below is on the preparation of chicken, and on reconstitution by microwave heating, the invention is applicable not only to the preparation of these comestibles, but also to the preparation of poultry of various types and forms as well as to the other above comestibles identified in the discussion above, and to their reconstitution by baking in a conventional oven, or by frying.

EXAMPLE 1

Uncooked chicken portions were fabricated from selected ratios of white and dark meat, ground and formed into 0.5 oz. sections. The portions were irregularly shaped disks having a diameter of 1-2 inches and a thickness of ¼ inch.

The uncooked, frozen chicken portions were tempered with a cold water rinse to remove surface ice crystals and then enrobed with a first coating in accordance with the present invention. The first coating was prepared by combining straight grade hard wheat flour with a plastic shortening. The hard wheat flour utilized in this example had the following characteristics (percentages are by weight):

| | |
|---|---|
| Protein | 11-12% |
| (N × 5.7, 14% moisture basis) | |
| Ash | 0.40-0.50% |
| (14% moisture basis) | |
| Minimum Water Absorption | 60% |
| (Brabender Farinograph | |
| American Association of | |
| Cereal Chemists Method 54-21) | |

The plastic shortening utilized was a blend of partially hydrogenated soybean, cottonseed and palm oils with the following characteristics:

| | |
|---|---|
| AOM Stability, hours | 200 |
| Wiley Melting Point, °C. | 38-43 |
| Solid Fat Index (SFI) | |
| @ 10° C. | 50-55 |
| @ 21° C. | 36-40 |
| @ 33° C. | 12-17 |
| @ 38° C. | 4-6 |

This first coating was prepared by adding to 1.0 parts of flour 0.4 parts of the plastic vegetable shortening and then hydrating with water in a range of 0.67 parts by weight to a maximum of 1.3 parts by weight, expressed in terms of the flour weight. The shortening was blended with the flour in a laboratory scale version of a large vertical paddle mixer of the type normally used to make dough or batter on a production scale.

The initial flour/shortening blending was done on the slowest speed until shortening particles were ¼ inch in diameter or sma Sufficient water was added to this material to yield a dough. Subsequent blending was done at an intermediate speed setting until a homogeneous dough was obtained.

The dough was sheeted to a 1/16 inch thickness and wrapped around the tempered chicken portions. The edges were pinched and cut to form a complete seal and docking holes were made in the surface of the sheeting with the tips of a fork.

After the first coating was applied, the product was gently stirred in boiling water at 100° C. for one minute and then fried for 1 to 2 minutes at a temperature in the range of 193°-200° C. by completely submerging the portions in a restaurant-style fryer containing the above described plastic shortening. This once fried product was weighed to determine the extent of the coating pick-up expressed as:

$$\frac{\text{final weight} - \text{raw weight}}{\text{final weight}} \times 100$$

It was found that the coating pick-up averaged between 15 and 20%.

After the first frying step, a second coating was applied by dipping the product in a prepared batter comprising:

| Ingredient | Percent By Weight |
| --- | --- |
| Yellow Corn Flour | 60.0 |
| Straight Grade Hard Wheat Flour | 32.0 |
| Sodium Bicarbonate, USP Powder | 1.5 |
| Sodium aluminum phosphate, acidic | 1.5 |
| Salt | 5.0 |

The yellow corn flour was a commercially available product having a cold water viscosity of about 80–250 centipoises when hydrated at one part of flour to two parts of water (determined on a Brookfield LVT viscometer using a #2 spindle while mixing for 30 seconds at a speed of 30 rpm). This batter was hydrated at one part to 1.6 parts of water, mixed until smooth and held for 10 minutes prior to use.

The dipped product was fried a second time for about 45–60 seconds at about 193–200° C. Again, the product was weighed to determine the total pick up, this time from the two coatings. It was found that the pick-up averaged a maximum of 40%. The twice coated portions were then frozen in metal trays at −30° C.

Finally, the frozen, coated portions were placed on vented, absorbent fiberboard trays possessing a raised gridboard bottom surface and microwave heated from the frozen state to a minimum internal temperature of 60° C. alternatively in a consumer (650 watt) and a commercial (1400 watt) microwave oven, respectively for 2 to 5 and 1 minute. The resulting product was organoleptically superior to that of fat-fried coated chicken portions, possessing superior appearance, texture and flavor.

EXAMPLE 2

In this example, the effect of the water bath treatment on freeze-thaw stability of chicken prepared in accordance with Example 1 was examined.

The following method was designed to simulate the effect of freeze-thaw cycling that might be encountered on extended storage of frozen comestibles:

a. Samples in closed containers are placed in storage at −18° C. for at least two days prior to initiating the freeze-thaw testing.

b. The products are removed from the freezer and thawed at room temperature (25° +2° C.) and then frozen again. This cycle of successive freezing and thawing is repeated four times over a period of 48 hours, whereupon the product is refrozen, removed from storage, and reconstituted in a microwave oven to a minimum internal temperature of 60° C.

Samples prepared with and without the water bath treatment were subjected to freeze-thaw testing according to the above method. The comestibles which were not subjected to the boiling step were objectionably chewy and doughy. The comestibles which were subjected to the boiling step, on the other hand, possessed a lighter bite and had perceptibly improved crispiness.

EXAMPLE 3

If the procedure of Example 2 were repeated by replacing the second coating described there with a 5% hydrated waxy maize starch batter and a supplemental breading, the freezer storage stability time could be doubled without impairing the light bite and crispiness of the reconstituted product.

EXAMPLE 4

If the procedure of Example 2 were repeated by replacing the water bath of that Example with a steam treatment at 100.5° to 121° C. for about 60 seconds, the resulting product would display a lighter bite and crispiness at least as good as that obtained in Example 2.

EXAMPLE 5

The nature of the coating obtained in a commercial breaded chicken nugget (FIG. 1) was compared with a chicken nugget prepared in accordance with the procedure described in Example 1 (FIGS. 2A & 2B) and again in accordance with the procedure described in Example 1 but with the once-coated nugget was subjected to treatment with boiling water at about 100°–125° C. for about sixty seconds during the course of its preparation.

The chicken substrate to coating interface in FIG. 1 is depicted at 120× magnification. The chicken substrate 10 carries a coating generally labelled 12. Coating 12 includes large lipid globules (not shown), a diffuse protein matrix 16, numerous voids 18 and ungelatinized starch 20. Scale bar 22 corresponds to 400 microns.

Figure 2A:
FIGS. 2A and 2B are photomicrographs of the substrate to coating interface of a chicken nugget coated in accordance with the procedure set forth in Example 1 below, in which the water bath treatment of the first coating has been eliminated.
Figure 2B:

In FIGS. 2A and 2B, the chicken substrate to coating interface is shown at 100× and 300× magnification respectively. Here, the chicken substrate 30, includes a coating 32 comprising large lipid globules 34, a diffuse protein (gluten) matrix 36, numerous voids 38 and ungelatinized starch 40. Scale bar 42 corresponds to ten microns.

Figure 3:
FIG. 3 is a photomicrograph of the substrate to coating interface of a chicken nugget coated in accordance with the procedure set forth in Example 1 below, in which the first coating is treated in a heated water bath as described in Example 1.

Finally, in FIG. 3, the chicken substrate to coating interface is shown at 200× magnification. Here, the chicken substrate 50 carries a coating depicted generally at 52, with an egg white adhesion agent 54 appearing at the substrate to coating interface. The coating includes a continuous gelatinized starch layer 56 containing only small amounts of diffuse lipid 58. Larger lipid globules 60 as well as the ungelatinized starch granules 62 and a diffuse protein matrix 64 are concentrated at the surface of the coating leaving behind a continuous gelatinized starch membrane adjacent to the substrate. Scale bar 66 in this figure corresponds to 100 microns.

In order to compare the distribution of starch, protein, and lipid components of these coatings, planimetric data were obtained on cross sectioned thickness of 750, 50, and 750 microns respectively of the three figures. This was done to demonstrate the continuity and integrity of the gelatinized starch layer produced through the application procedure described above and represented by the product of FIG. 3.

The relative percentages, in terms of respective areas as measured by the planimeter, of the coating components are listed below.

| | Protein, % | Lipid, % | Holes, Voids, % | Starch, % |
| --- | --- | --- | --- | --- |
| FIG. 1 | 33 | * | 39 | 28 |

-continued

| | Protein, % | Lipid, % | Holes, Voids, % | Starch, % |
|---|---|---|---|---|
| Commercial Nugget FIG. 2a | 38 | 13 | 16 | 33 |
| Nugget in accord with Invention, no boiling FIG. 3 | 9 | 5 | 0 | 86 |
| Nuggets in accord with Invention, boiling step included | | | | |

*Lipids were not discernibly stained in this micrograph.

Note that the coating represented in FIG. 3 contained a significantly
proportion of starch in the layer (approximately 750 microns thick) immediately next to the chicken substrate. It is this membrane or coating of gelatinized starch which is believed to contribute significantly to the functionality and storage stability of the present system.

While the present invention is described above in connection with preferred or illustrative embodiments, these embodiments are not intended to be exhaustive or limiting of the invention. Rather, the invention is intended to cover all alternatives, modifications, and equivalents included within its spirit and scope, as defined by the appended claims.

What is claimed is:

1. A storage stable comestible comprising:
a comestible chosen from the group consisting of poultry, fish, red meats, egg products, vegetables, cheeses, fruits and fabricated foods having a generally continuous gelatinized starch membrane around the comestible.

* * * * *